US008140861B2

(12) United States Patent  (10) Patent No.: US 8,140,861 B2
Lohman et al.  (45) Date of Patent: Mar. 20, 2012

(54) METHOD AND SYSTEM FOR CONTENT-BASED ENCRYPTED ACCESS TO A DATABASE

(75) Inventors: Guy M. Lohman, San Jose, CA (US); Mark F. Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 1248 days.

(21) Appl. No.: 11/617,597

(22) Filed: Dec. 28, 2006

(65) Prior Publication Data

US 2008/0162946 A1  Jul. 3, 2008

(51) Int. Cl.
 *G06F 11/30* (2006.01)
(52) U.S. Cl. ....................................................... 713/193
(58) Field of Classification Search ................... 713/193
 See application file for complete search history.

(56) References Cited

U.S. PATENT DOCUMENTS

| 5,778,395 | A | * | 7/1998 | Whiting et al. ........................ 1/1 |
| 6,363,478 | B1 | | 3/2002 | Lambert et al. |
| 2004/0153458 | A1 | | 8/2004 | Noble et al. |
| 2006/0085344 | A1 | * | 4/2006 | Grim et al. ....................... 705/51 |

FOREIGN PATENT DOCUMENTS

| JP | 2004-048557 A | 2/2004 |
| JP | 2004-282116 A | 10/2004 |

OTHER PUBLICATIONS

Bruce Schneier, Applied Cryptography, 1996, John Wiley and Sonds, Second edition, pp. 455-459.*
Schneier; "Cryptographic Protection of Databases"; XP-002958299; Applied Cryptography; 1996; pp. 73-74.
Barath Raghaven, et al.; :A System for Authenticated Policy-Compliant Routing; 2004; pp. 167-178; University of California, San Diego; USA.
Joon S. Park; "Towards Secure Collaboration on the Semantic Web"; 2005; pp. 1-9; School of Information Studies, Syracuse University; Syracuse, NY; USA.
Benny Pinkas; "Cryptographic Techniques for Privacy-Preserving Data Mining"; 2003; pp. 12-19; vol. 4, Issue 2; HP Labs.

* cited by examiner

*Primary Examiner* — Jacob Lipman
(74) *Attorney, Agent, or Firm* — Sughrue Mion, PLLC

(57) ABSTRACT

Some aspects of the invention provide methods, systems, and computer program products for inserting an encrypted problem signature into a symptom database. A problem signature is first provided, which is then used to derive a hash value. The problem signature is then encrypted using the hash value. The hash value is further used to indicate the location in the database to insert the problem signature. The problem signature is then inserted at the location in the database indicated by the location.

23 Claims, 4 Drawing Sheets

METHOD AND SYSTEM FOR CONTENT-BASED ENCRYPTED ACCESS TO A DATABASE

FIELD OF THE INVENTION

The invention relates to database access and, in particular, to methods, systems, and computer program products for content-based encrypted access to a database.

BACKGROUND OF THE INVENTION

There is a large investment in autonomic computing in the industry. One of the more promising areas of technology is automated self-diagnosis. One major form of self-diagnosis works by identifying known problems from a symptom database that contains problem signatures. Problem signatures are a programmatically interpretable form of a problem symptom. For example, for an error condition in a software product, the symptom might be a function stack condition: function1( )+53; function2( )+234; function3( )+643; function4( )+34; function5( )+534.

The problem signature for this particular trace could be as simple as the function ordering: function5->function4->function3->function2->function 1. The problem signature could also be much more complex, including the function names and offsets (also: type of trap, function arguments, top functions on the stack, etc, etc). It could also include other information types: statistics, configuration parameters, and key performance indicators. A symptom database may also contain one or more actions for each problem signature. These actions should be programmatic instructions to solve the problem and/or human readable instructions for what the problem is and how to solve it.

The challenge with symptom databases is that in order to be effective, they must contain a significant number of problem signatures. The more effective a symptom database is, the more problem signatures it would contain, all with their associated explanations and actions.

One of the goals of using symptom databases is to ship them with a product and install them locally and securely on a customer site. This is where the current technology is lacking. Since such a database contains a thorough and detailed list of problems for a product, and it could identify sensitive problems such as data corruption or other major problems, fallen into the wrong hands it could be used as very effective marketing material for competitors of the product developer.

Applying encryption on a blanket-basis to the entire symptom database would fail since watching the decryption mechanism via a debugger would reveal to a third party how to decrypt the entire symptom database. The invention does address this problem.

SUMMARY OF THE INVENTION

A preferred embodiment of the invention is directed to a method for inserting an encrypted entity signature into a database comprising the steps of: providing a entity signature; deriving a hash value from the entity signature; encrypting the entity signature using the hash value; determining a location in the database to insert the entity signature indicated by the hash value; and inserting the entity signature at the location in the database indicated by the location.

In accordance with one aspect of the invention, the location in the database to insert the entity signature is indicated by the hash value. In a variation, collision resolution is available in the event that a collision occurs at the location indicated by the hash index.

In accordance with one aspect of the invention, encrypting the entity signature using the hash value comprises combining the hash value and a blanket encryption key to generate an encryption key by hashing for encrypting the entity signature. In a variation, combining the hash value and the blanket encryption key comprises the step of adding the hash value and the blanket encryption key using modulo arithmetic.

In accordance with another aspect of the invention, encrypting the entity signature using the hash value comprises the step of combining the entity signature and a blanket encryption key to generate an encryption key by hashing for encrypting the entity signature, wherein the hash value is derived by a first hash function operating on the entity signature and the blanket encryption key, the first function being different from a second hash function for generating the encryption key.

In accordance with another aspect of the invention, encrypting the entity signature using the hash value comprises the step of combining the entity signature and a blanket encryption key to generate an encryption key by hashing for encrypting the entity signature wherein the hash value is derived by a first hash function different from a second hash function for generating the encryption key.

In accordance with another aspect of the invention, the entity signature is a problem signature and the database is a symptom database.

In accordance with another aspect of the invention, the method further comprises a database operation chosen from the group consisting of: deleting the entity signature from the database; and reading the entity signature from the database.

According to a further embodiment of the invention, there is provided a system for inserting an encrypted entity signature into a database comprising: an element for providing a entity signature; an element for deriving a hash value from the entity signature; an element for encrypting the entity signature using the hash value; an element for determining a location in the database to insert the entity signature indicated by the hash value; and an element for inserting the entity signature at the location in the database indicated by the location.

According to even a further embodiment of the invention, there is provided a computer program product comprising a computer usable medium including computer usable program code for inserting an encrypted entity signature into a database, the computer program product comprising: computer usable program code for providing a entity signature; computer usable program code for deriving a hash value from the entity signature; computer usable program code for encrypting the entity signature using the hash value; computer usable program code for determining a location in the database to insert the entity signature indicated by the hash value; and computer usable program code for inserting the entity signature at the location in the database indicated by the location.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION

This invention provides for a method for generating and accessing a symptom database comprising a plurality of problem signatures and its corresponding information. The information may include an action, which refers to programmatic instructions to solve the problem and/or human readable instructions for what the problem is and how to solve it.

Figure 1:
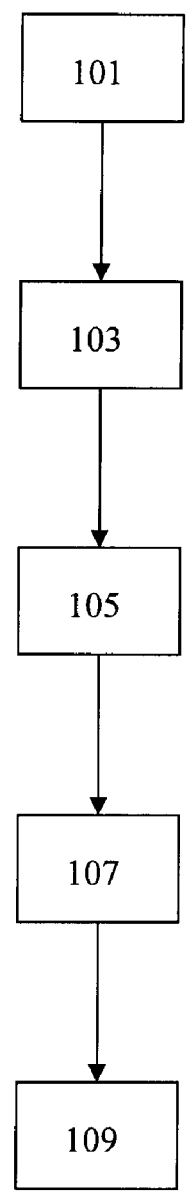
FIG. 1 is a flowchart illustrating steps of a first method of inserting a problem signature into a symptom database in accordance with aspects of the invention.

With reference to FIG. 1, the steps of a preferred embodiment of the invention in terms of a method for inserting a problem signature entry in a symptom database are illustrated. In step 101, a problem signature is provided. (In a variation, the symptom of the problem may first be provided which is then used to generate the problem signature. The symptom may include a function stack trace: function names, parameters, offsets.) The problem signature may include the function names, offsets and function ordering (possibly type of trap, function arguments, top functions on the stack, etc, etc). In step 103, a hash function is applied to the problem signature in order to derive a hash value. There are a variety of such hash functions known to a person skilled in the relevant art. One such function could be just the sum of the ASCII values of the problem signature.

The hash value is used as in an encryption scheme (e.g. as the encryption key or part thereof to encrypt the problem signature: step 105. A number of encryption algorithms may be used, such as TDES. At step 107, the hash value is also used to locate the place in the symptom database where the problem signature is to be placed.

The problem signature is then placed into the symptom database at the determined location in step 109. It is clear to a person skilled in the art that collision resolution methods may need to be employed.

A competitor who wanted to decrypt the symptom database would have to know what the symptom was first, since it would be part of the required key to decrypt the symptom. However, anyone who actually encountered the problem would have the right key to decrypt the symptom, in the form of the symptom's signature.

It would not be practical for competitors or for customers to try to decrypt the symptom database, since they would need to know the encryption key for each problem signature. Each problem signature would have its own encryption key.

Figure 2:
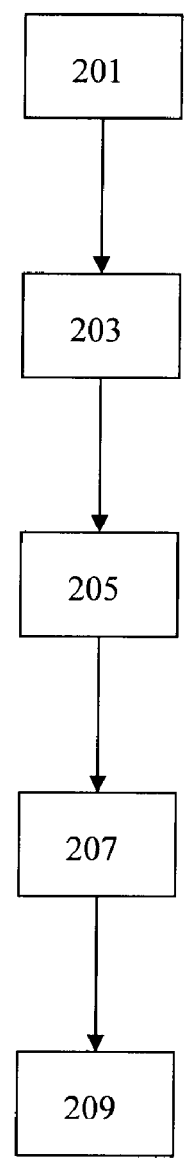
FIG. 2 is a flowchart illustrating steps of a second method of inserting a problem signature into a symptom database in accordance with aspects of the invention.

FIG. 2 shows the steps of another preferred embodiment of the present invention. In step 201, a problem signature is provided. (In a variation, the symptom of the problem may first be provided which is then used to generate the problem signature. The symptom may include a function stack trace: function names, parameters, offsets.) The problem signature may include the function names, offsets, and function ordering (possibly type of trap, function arguments, top functions on the stack, etc, etc). In step 203, a hash function is applied to the problem signature in order to derive a hash value (or hash key). There are a variety of such hash functions known to a person skilled in the relevant art. One such function could be just the sum of the ASCII values of the problem signature.

The hash value is used in an encryption scheme (e.g. as the encryption key or part thereof) in combination with a blanket encryption key (e.g. "pa$$w0rd") to encrypt the problem signature: step 205. The combination scheme may simply be the addition of the hash value and the blanket encryption key (possibly using modulo arithmetic); other similar combination schemes may be employed. A number of encryption algorithms may be used on this combined key, such as TDES (Triple Data Encryption Standard). At step 207, the hash value is also used to locate the place in the symptom database where the problem signature is to be placed. In a variation to this, the combination may be used to locate the place in the symptom database.

The problem signature is then placed into the symptom database at the determined location in step 209. It is clear to a person skilled in the art that collision resolution methods may need to be employed.

The above described blanket encryption key, such as "pa$$w0rd", would prevent different people from sharing or posting any keys amongst themselves (or on the Internet). Ideally each one would get a separate key based on the host ID of their system. This blanket encryption key is not critical but adds an extra layer of security. Here is a scenario in which it would be useful: Customer #1 buys a subscription to receive the updated symptom database. Customer #2 has not bought the subscription but would like to use the symptom database without a license. Since they have not signed up for the service, they have not signed the appropriate legal documents, etc. Customer #2 cannot use customer #1's symptom database because it would be encrypted using customer #1's blanket key. They cannot steal another customer's symptom database. If customer #1 gives the blanket key to customer #2, customer #1 may be in breach of a licensing agreement. Customer #2 cannot easily get the encryption key with a debugger because they need to know the key to decrypt the data.

The hash key is different and ensures that customer #1 doesn't see every problem that the product has. Customer #1 gets to use the information from the symptom database that directly applies to it (only if it encounters a problem, would it be able to get the related resolution).

For example, the problem signature (function5–>function4–>function3–>function2–>function 1) could have a hash key value of 0x987424298729821012 (a hash key could be as simple as treating the problem signature as a long string of numeric values and adding them together with modulo arithmetic). The key to encrypt this problem signature would then be a combination of "pa$$w0rd" and 0x987424298729821012. Anyone trying to decrypt this problem signature would need to know both the hash-key and the blanket-key.

Figure 3:
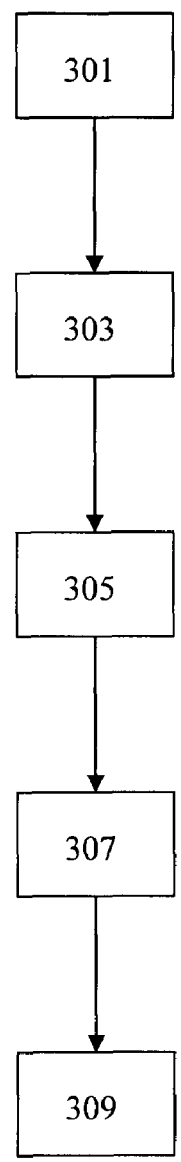
FIG. 3 is a flowchart illustrating steps of a third method of inserting a problem signature into a symptom database in accordance with aspects of the invention.

FIG. 3 shows the steps of a further preferred embodiment of the present invention. In step 301, a problem signature is provided. (In a variation, the symptom of the problem may first be provided which is then used to generate the problem signature. The symptom may include a function stack trace: function names, parameters, offsets.) The problem signature may include the function names and offsets (possibly type of trap, function arguments, top functions on the stack, etc, etc). In step 303, a first hash function is applied to the problem signature (a numerical version thereof) and a blanket encryption key in order to derive a first hash value (or hash key). There are a variety of such hash functions known to a person skilled in the relevant art. One such function could be just the sum of the ASCII values of the problem signature and the blanket encryption key.

A second hash value is derived using a second hash function (different from the first hash function) operating on the blanket encryption key and the problem signature (a numerical version thereof to generate an encryption key: step 305. At step 307, the first hash value is used to locate the place in the symptom database where the problem signature is to be placed. In a variation to this, the combination may be used to locate the place in the symptom database.

The problem signature is then placed into the symptom database at the determined location in step 309. It is clear to a person skilled in the art that collision resolution methods may need to be employed.

Figure 4:
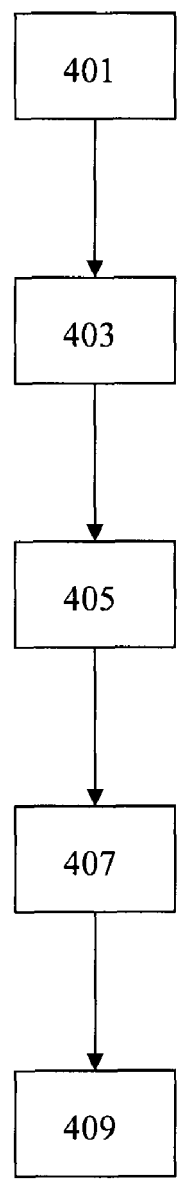
FIG. 4 is a flowchart illustrating steps of a fourth method of inserting a problem signature into a symptom database in accordance with aspects of the invention.

FIG. 4 shows the steps of yet another preferred embodiment of the present invention. In step 401, a problem signature is provided. (In a variation, the symptom of the problem may first be provided which is then used to generate the problem signature. The symptom may include a stack trace: function names, parameters, offsets.) The problem signature may include the function names, offsets, and function ordering (possibly type of trap, function arguments, top functions on the stack, etc, etc). In step 403, a hash function is applied to the problem signature in order to derive a hash value (or hash key). There are a variety of such hash functions known to a person skilled in the relevant art. One such function could be just the sum of the ASCII values of the problem signature.

The hash value is used in an encryption scheme (e.g. as the encryption key or part thereof in combination with a blanket encryption key (e.g. "pa$$w0rd") to encrypt the problem signature: step 405. The combination scheme may simply be the addition of the hash value and the blanket encryption key; other similar combination schemes may be employed. A number of encryption algorithms may be used on this combined key, such as TDES. At step 407, employ a second hash function (different from the first) to the problem signature to derive a second hash value to locate the place in the symptom database where the problem signature is to be placed. For example, the second hash function may involve an XOR (exclusive or) operation, whereas the first hash function could just be addition. The second hash function could also be a more advanced and lossy hash algorithm that would be virtually impossible to map back to the first hash value. For example, use XOR first and then remove the odd bits if the result is odd and even bits if the result is even.

The problem signature is then placed into the symptom database at the determined location in step 409. It is clear to a person skilled in the art that collision resolution methods may need to be employed.

It is clear to a person skilled in the art that the methods described above may be used to generate a symptom database, and parts thereof to access specific symptoms using the corresponding problem signatures. This access may be for reading or deletion, or other database-related functions.

As a result, the symptom database would be laid out like a stream of problem signatures with a hash key index, each problem signature having its own encryption key.

As a result: (a) the encryption of the problem signatures precludes one from being able to exhaustively list all locations (buckets in the database); and (b) it is nearly impossible to find an entry in the database without having the exact specification of its problem signature.

A full problem signature can be a conditions, loops or even algorithms that may be used to identify a problem. The full investigation and matching of a problem to an action may require a full decision tree of symptoms. The investigation would start with a primary problem signature (e.g. an error code) which may then decrypt a set of actions (which may not be to resolve the problem but could also be further investigation). The investigation steps would gather more information from the and then use that information to decrypt further information until either there is no match for the problem or until an action is encountered. In other words, symptom databases may not always be a flat list of problem signatures and actions.

Although the invention is discussed in terms of problem signatures and symptom databases, it is not so limited and can apply to an application in which the entity signature being searched for can be used to encrypt and possibly to locate the data of interest in a database, thereby preventing a complete listing of the entity signatures in the database. For example, the entries of a database of customer information could be encrypted by their corresponding customer name. In this way, if someone searching the database was looking for a particular individual, they could locate that person, since the encryption key would be based upon the (known) customer name, but they couldn't list all customers. The assumption is that the space of hash buckets must be sufficiently large, which is the case for problem signatures associated with most function stacks.

The invention is further not limited to databases, but could also work on a file system, for example, or any data structure in which portions are individually addressable, and access should be granted only to those who know precisely what object they are looking for, but to no one else.

Aspects of the invention may be embodied in a number of forms. For example, various aspects of the invention can be embodied in a suitable combination of hardware, software and firmware. In particular, some embodiments include, without limitation, entirely hardware, entirely software, entirely firmware or some suitable combination of hardware, software and firmware. In a preferred embodiment, the invention is implemented in software, which includes but is not limited to firmware, resident software, microcode, etc.

Additionally and/or alternatively, aspects of the invention can be embodied in the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A computer-readable medium can be an electronic, magnetic, optical, electromagnetic, infrared, or semiconductor system (or apparatus or device) or a propagation medium. Examples of a computer-readable medium include a semiconductor and/or solid-state memory, magnetic tape, a removable computer diskette, a random access memory (RAM), a read-only memory (ROM), a rigid magnetic disk and an optical disk. Current examples of optical disks include, without limitation, compact disk—read only memory (CD-ROM), compact disk—read/write (CD-R/W) and DVD.

In accordance with aspects of the invention, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (i.e. I/O devices)—including but not limited to keyboards, displays, pointing devices, etc.—can be coupled to the system either directly or through intervening I/O controllers.

Network adapters may also be coupled to the system to enable communication between multiple data processing systems, remote printers, or storage devices through intervening private or public networks. Modems, cable modems and Ethernet cards are just a few of the currently available types of network adapters.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above teachings.

What is claimed is:

1. A method, using a processor, for inserting an encrypted entity signature into a database, the method comprising the steps of:
    providing a entity signature;
    deriving a first hash value and a second hash value from the entity signature;
    obtaining an encryption key based on the first hash value;
    encrypting the entity signature using the encryption key;
    determining a location in the database to insert the encrypted entity signature; and
    inserting the entity signature at the location in the database based on the second hash value.

2. The method of claim 1, wherein:
    the step of obtaining an encryption key comprises:
    combining the entity signature and a blanket encryption key; and
    generating the encryption key for encrypting the entity signature by hashing a result of combining the entity signature and the blanket encryption key using a first hash function,
    wherein the first hash function is different from a second hash function used for generating the second hash value indicating the location in the database for inserting the encrypted entity signature.

3. The method of claim 1, wherein: the entity signature is hashed using a first hash function to obtain the first hash value and the first hash value is combined with a blanket encryption key to generate the encryption key,
    the entity signature is hashed using a second hash function to obtain the second hash value, which indicates the location in the database for inserting the encrypted entity signature.

4. The method of claim 1, wherein the entity signature is a problem signature and the database is a symptom database.

5. The method of claim 1, further comprising a database operation chosen from the group consisting of:
    deleting the entity signature from the database; and
    reading the entity signature from the database.

6. The method of claim 1, wherein the first and second hash values are same.

7. The method of claim 1, wherein the location in the database to insert the encrypted entity signature is indicated by the second hash value.

8. The method of claim 7, wherein collision resolution is available in the event that a collision occurs at the location indicated by the hash index.

9. The method of claim 1, wherein the first hash value and a blanket encryption key are combined to generate the encryption key for encrypting the entity signature.

10. The method of claim 9, wherein the first hash value and the blanket encryption key are added using modulo arithmetic.

11. A system for inserting an encrypted entity signature into a database using a processor, the system comprising:
    an element for providing a entity signature;
    an element for deriving a first hash value and a second hash value from the entity signature;
    an element for encrypting the entity signature using an encryption key derived based on the first hash value;
    an element for determining a location in the database to insert the encrypted entity signature indicated, the location in the database based on the second hash value; and
    an element for inserting the entity signature at the location in the database indicated by the location.

12. The system of claim 11, wherein: the entity signature and a blanket encryption key are combined,
    the encryption key is the first hash value generated by hashing the combined entity signature and blanket encryption key using a first hash function,
    the location in the database for the encrypted entity signature is indicated by the second hash value generated by hashing the combined entity signature and blanket encryption key using a second hash function, and
    the first hash function is different from the second hash function.

13. The system of claim 11, wherein:
    the entity signature is hashed using a first hash function to obtain the first hash value and the first hash value is combined with a blanket encryption key to generate the encryption key,
    the entity signature is hashed using a second hash function to obtain the second hash value, which indicates the location in the database for inserting the encrypted entity signature.

14. The system of claim 11, wherein the entity signature is a problem signature and the database is a symptom database.

15. The system of claim 11, further comprising:
    an element for deleting the entity signature from the database; and
    an element for reading the entity signature from the database.

16. The system of claim 11, wherein the first and second hash values are same.

17. The system of claim 11, wherein the location in the database to insert the entity signature is indicated by the second hash value.

18. The system of claim 17, wherein collision resolution is available in the event that a collision occurs at the location indicated by the hash index.

19. The system of claim 11, wherein the first hash value and a blanket encryption key are combined to generate the encryption key for encrypting the entity signature.

20. The system of claim 19, wherein the first hash value and the blanket encryption key are added using modulo arithmetic to generate the encryption key.

21. A computer program product comprising a computer usable medium including computer usable program code for inserting an encrypted entity signature into a database, the computer program product comprising:
    computer usable program code for providing a entity signature;
    computer usable program code for deriving a first hash value and a second hash value from the entity signature;

computer usable program code for encrypting the entity signature using an encryption key derived based on the first hash value;
computer usable program code for determining a location in the database to insert the encrypted entity signature indicated by the second hash value; and
computer usable program code for inserting the encrypted entity signature at the location in the database indicated by the location.

22. The computer program product of claim 21, wherein the location in the database to insert the encrypted entity signature is indicated by the second hash value.

23. The computer program product of claim 21, wherein the first and second hash values are same.

* * * * *